United States Patent
Baba et al.

(10) Patent No.: US 12,097,871 B2
(45) Date of Patent: Sep. 24, 2024

(54) DRIVE ASSIST APPARATUS, DRIVE ASSIST METHOD, AND PROGRAM

(71) Applicant: HONDA MOTOR CO., LTD., Tokyo (JP)

(72) Inventors: Ichiro Baba, Wako (JP); Yosuke Koike, Wako (JP); Kenji Komori, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 18/075,462

(22) Filed: Dec. 6, 2022

(65) Prior Publication Data

US 2023/0202500 A1     Jun. 29, 2023

(30) Foreign Application Priority Data

Dec. 27, 2021  (JP) .................... 2021-213201

(51) Int. Cl.
*B60W 50/14*  (2020.01)
*B60W 40/04*  (2006.01)

(52) U.S. Cl.
CPC .......... *B60W 50/14* (2013.01); *B60W 40/04* (2013.01); *B60W 2050/143* (2013.01); *B60W 2050/146* (2013.01); *B60W 2554/80* (2020.02)

(58) Field of Classification Search
CPC .......... B60W 50/14; B60W 40/04; B60W 2050/143; B60W 2050/146; B60W 2554/80
See application file for complete search history.

(56) References Cited

U.S. PATENT DOCUMENTS

| 2013/0271295 A1* | 10/2013 | Huelbusch | B60W 50/14 340/907 |
| 2022/0032906 A1* | 2/2022 | You | B60W 30/08 |
| 2022/0306112 A1* | 9/2022 | Yan | B60W 40/04 |

FOREIGN PATENT DOCUMENTS

| EP | 2302412 A1 * | 3/2011 | ............ B60T 7/22 |
| JP | 2008-102690 | 5/2008 | |
| JP | 2015-130069 | 7/2015 | |
| JP | 2018-031878 | 3/2018 | |
| JP | 2018-092505 | 6/2018 | |
| JP | 2021-187362 | 12/2021 | |
| WO | 2016/024318 | 2/2016 | |

OTHER PUBLICATIONS

Japanese Office Action for Japanese Patent Application No. 2021-213201 mailed May 14, 2024.

* cited by examiner

*Primary Examiner* — Nabil H Syed
*Assistant Examiner* — Cal J Eustaquio
(74) *Attorney, Agent, or Firm* — Amin, Turocy & Watson, LLP (57) ABSTRACT

A drive assist apparatus includes: an avoidance target recognition portion that recognizes an avoidance target which is a target with which a host vehicle should avoid coming into contact when traveling on a road; and an output control portion that causes an output device to output an advice for a driver who drives the host vehicle at a plurality of stages which include: a pre-stage before mutual passing between the host vehicle and the avoidance target; and a post-stage after the mutual passing.

14 Claims, 8 Drawing Sheets

DRIVE ASSIST APPARATUS, DRIVE ASSIST METHOD, AND PROGRAM

CROSS-REFERENCE TO RELATED APPLICATION

Priority is claimed on Japanese Patent Application No. 2021-213201, filed on Dec. 27, 2021, the contents of which are incorporated herein by reference.

BACKGROUND

Field of the Invention

The present invention relates to a drive assist apparatus, a drive assist method, and a program.

Background

In recent years, a drive assist apparatus has been disclosed which assists driving of a driver when a host vehicle passes another vehicle. For example, Japanese Unexamined Patent Application, First Publication No. 2018-92505 describes a technique that determines whether or not a host vehicle is passing another vehicle using a camera provided on the host vehicle, notifies a driver of a situation around the host vehicle when the host vehicle is passing the other vehicle, and terminates the notification in response to the passing having been completed.

SUMMARY

However, according to the technique described in Japanese Unexamined Patent Application, First Publication No. 2018-92505, since the notification is made only when the host vehicle and the other vehicle are mutually passing, and the notification is terminated in response to the completion of the mutual passing, there may be cases in which it is impossible to perform an appropriate drive assist notification at a plurality of stages that include a stage before the mutual passing and a stage after the mutual passing.

An aspect of the present invention is intended to provide a drive assist apparatus, a drive assist method, and a program capable of performing an appropriate drive assist notification at a plurality of stages that include a stage before mutual passing and a stage after mutual passing.

A drive assist apparatus according to a first aspect of the present invention includes: an avoidance target recognition portion that recognizes an avoidance target which is a target with which a host vehicle should avoid coming into contact when traveling on a road; and an output control portion that causes an output device to output an advice for a driver who drives the host vehicle at a plurality of stages which include: a pre-stage before mutual passing between the host vehicle and the avoidance target; and a post-stage after the mutual passing, wherein the advice is different for each of the plurality of stages.

A second aspect is the drive assist apparatus according to the first aspect described above which may further include: a margin detection portion that detects a margin indicating a distance between the host vehicle and the avoidance target at a time of the mutual passing, wherein the output control portion may cause the output device to output the advice corresponding to a driving tendency of the driver at the pre-stage before the mutual passing based on the margin detected by the margin detection portion at a previous time of the mutual passing.

A third aspect is the drive assist apparatus according to the second aspect described above which may further include: an evaluation portion that evaluates a driving of the driver at the time of the mutual passing based on the margin detected by the margin detection portion, wherein the output control portion may cause the output device to output the advice based on an evaluation result of the evaluation portion at the post-stage after the mutual passing.

A fourth aspect is the drive assist apparatus according to the second or third aspect described above, wherein the margin detection portion may detect, as the margin, a shortest distance between the host vehicle and the avoidance target at the time of the mutual passing.

A fifth aspect is the drive assist apparatus according to any one of the first to fourth aspects described above, wherein the output control portion may not cause the output device to output the advice at a stage in which the mutual passing is being performed.

A sixth aspect is the drive assist apparatus according to any one of the first to fifth aspects described above which may further include: a travelable width detection portion that detects a travelable width indicating a width of the road where the host vehicle is travelable, wherein the output control portion may not cause the output device to output the advice in a case where the travelable width detected by the travelable width detection portion is larger than a predetermined width.

A seventh aspect is the drive assist apparatus according to any one of the first to sixth aspects described above which may further include: a distance measurement portion that measures a distance between the host vehicle and the avoidance target in a travel direction of the host vehicle, wherein the output control portion may determine whether or not the host vehicle reaches the pre-stage before the mutual passing or the post-stage after the mutual passing based on the distance measured by the distance measurement portion.

An eighth aspect is the drive assist apparatus according to the sixth aspect described above which may further include: a distance measurement portion that measures a distance, in a travel direction of the host vehicle, between the host vehicle and a position where the travelable width detected by the travelable width detection portion is equal to or less than the predetermined width, wherein the output control portion may determine whether or not the host vehicle reaches the pre-stage before the mutual passing or the post-stage after the mutual passing based on the distance measured by the distance measurement portion.

A ninth aspect of the present invention is a drive assist method by a computer, including: recognizing an avoidance target which is a target with which a host vehicle should avoid coming into contact when traveling on a road; and causing an output device to output an advice for a driver who drives the host vehicle at a plurality of stages which include: a pre-stage before mutual passing between the host vehicle and the avoidance target; and a post-stage after the mutual passing, wherein the advice is different for each of the plurality of stages.

A tenth aspect of the present invention is a computer-readable non-transitory recording medium which includes a program causing a computer to: recognize an avoidance target which is a target with which a host vehicle should avoid coming into contact when traveling on a road; and cause an output device to output an advice for a driver who drives the host vehicle at a plurality of stages which include: a pre-stage before mutual passing between the host vehicle and the avoidance target; and a post-stage after the mutual passing, wherein the advice is different for each of the plurality of stages.

According to the first to tenth aspects described above, it is possible to perform an appropriate drive assist notification at a plurality of stages that include a stage before mutual passing and a stage after mutual passing.

DESCRIPTION OF EMBODIMENTS

Hereinafter, a drive assist apparatus, a drive assist method, and a program according to an embodiment of the present invention will be described with reference to the drawings.

First Embodiment

[Overall Configuration]

Figure 1:
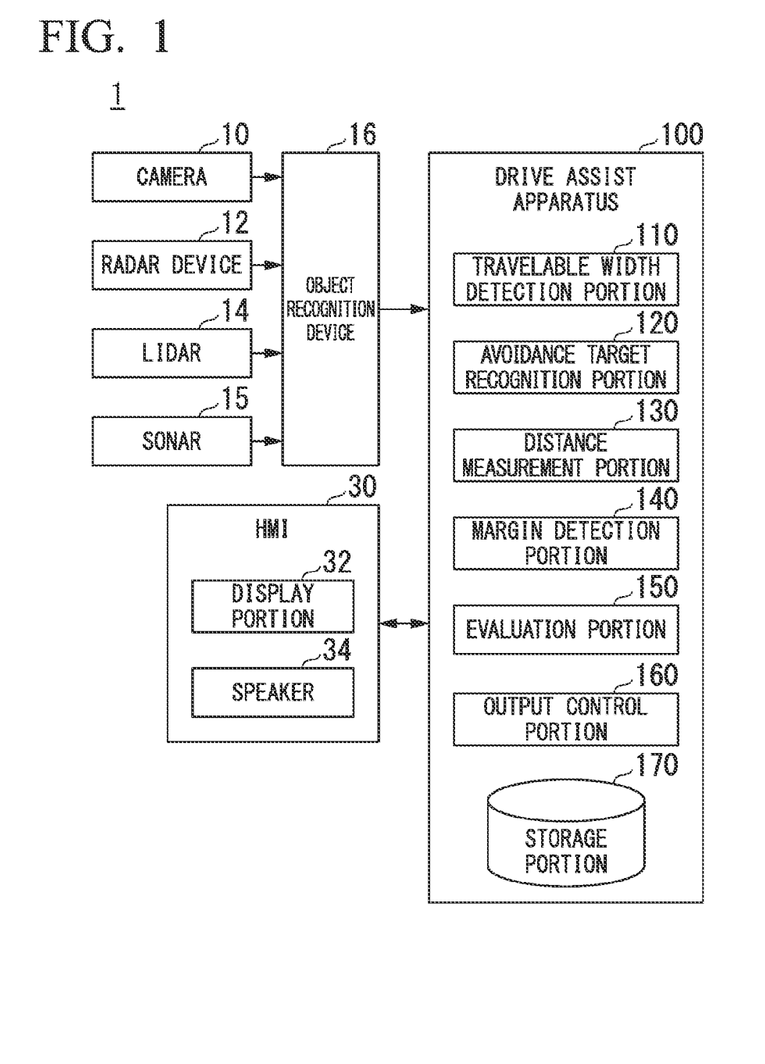
FIG. 1 is a configuration view of a vehicle system utilizing a drive assist apparatus according to a first embodiment.

FIG. 1 is a configuration view of a vehicle system 1 utilizing a drive assist apparatus according to a first embodiment.

A vehicle on which the vehicle system 1 is provided is, for example, a two-wheel, three-wheel, or four-wheel vehicle, and a drive source thereof is an internal combustion engine such as a diesel engine or a gasoline engine, an electric motor, or a combination thereof. The electric motor operates using electric power generated by an electric generator connected to the internal combustion engine, or electric power discharged from a secondary battery or a fuel cell.

The vehicle system 1 includes, for example, a camera 10, a radar device 12, a LIDAR (Light Detection And Ranging) 14, a sonar 15, an object recognition device 16, a HMI (Human Machine Interface) 30, and a drive assist apparatus 100. These devices and apparatuses are connected to one another by a multiplex communication line such as a CAN (Controller Area Network) communication line, a serial communication line, a wireless communication network, or the like. The configuration shown in FIG. 1 is merely an example. Part of the configuration may be omitted, or another configuration may be further added.

The camera 10 is, for example, a digital camera that utilizes a solid-state imaging device such as a CCD (Charge Coupled Device) or a CMOS (Complementary Metal Oxide Semiconductor). The camera 10 is attached to an arbitrary place of a vehicle on which the vehicle system 1 is provided. When a forward direction is imaged, the camera 10 is attached to an upper portion of a front windshield, a rear surface of a rearview mirror, or the like. For example, the camera 10 periodically repeatedly images the vicinity of the vehicle. The camera 10 may be a stereo camera.

The radar device 12 radiates radio waves such as millimeter waves to the vicinity of the vehicle, detects radio waves (reflected waves) reflected by an object, and detects at least a position (a distance and an orientation) of the object. The radar device 12 is attached to an arbitrary place of the vehicle. The radar device 12 may detect the position and a speed of the object using a FM-CW (Frequency Modulated Continuous Wave) method.

The LIDAR 14 radiates light (or electromagnetic waves having a wavelength close to that of light) to the vicinity of the vehicle and measures scattered light. The LIDAR 14 detects a distance to a target on the basis of time from light emission to light reception. The radiated light is, for example, pulsed laser light. The LIDAR 14 is attached to an arbitrary place of the vehicle. The LIDAR 14 detects the distance from the vehicle to the target by scanning in a transverse direction and a longitudinal direction relative to a proceeding direction of the vehicle.

The sonar 15 radiates ultrasonic waves to the vicinity of the vehicle, detects reflection or scattering by an object that is present within a predetermined distance from the vehicle, and thereby detects a distance to the object, a position of the object, or the like. The sonar 15 is provided, for example, on a front end portion and a rear end portion of the vehicle and is arranged on a bumper or the like.

The object recognition device 16 performs a sensor fusion process on a result of detection performed by some or all of the camera 10, the radar device 12, the LIDAR 14, and the sonar 15 and recognizes a position, a type, a speed, and the like of the object. The object recognition device 16 outputs a result of recognition to the drive assist apparatus 100. The object recognition device 16 may output the result of detection by the camera 10, the radar device 12, the LIDAR 14, and the sonar 15 as is to the drive assist apparatus 100. The function of the object recognition device 16 may be incorporated into the drive assist apparatus 100, and the object recognition device 16 may be omitted from the vehicle system 1. The object recognized by the object recognition device 16 includes an avoidance target which is a target with which the vehicle should avoid coming into contact when traveling on a road, and a road boundary which is a boundary between a road and an area other than the road.

The HMI 30 presents various types of information to an occupant of the vehicle and receives an input operation by the occupant. The HMI 30 includes a display portion 32 and a speaker 34. The display portion 32 may be, for example, a display portion provided in a meter or a head-up display (HUD). The speaker 34 may be, for example, an audio output device provided in a vehicle room of the vehicle.

The HMI 30 may include a buzzer, a touch panel, a switch, a key, and the like in addition to the display portion 32 and the speaker 34.

The drive assist apparatus 100 is a device that assists driving of a vehicle by a driver. The drive assist apparatus 100 includes, for example, a travelable width detection portion 110, an avoidance target recognition portion 120, a distance measurement portion 130, a margin detection portion 140, an evaluation portion 150, an output control portion 160, and a storage portion 170. The travelable width detection portion 110, the avoidance target recognition portion 120, the distance measurement portion 130, the margin detection portion 140, the evaluation portion 150, and the output control portion 160 are each realized, for example, by a hardware processor such as a CPU (Central Processing Unit) executing a program (software). Some or all of these components may be realized by hardware (a circuit portion; including circuitry) such as a LSI (Large Scale Integration), an ASIC (Application Specific Integrated Circuit), a FPGA (Field-Programmable Gate Array), and a GPU (Graphics Processing Unit), and may also be realized by cooperation of software and hardware. The program may be stored in advance in a storage device (a storage device that includes a non-transitory storage medium) of the drive assist apparatus 100 such as a HDD or a flash memory, or may be stored in a removable storage medium (non-transitory storage medium) such as a DVD or a CD-ROM and be installed to the HDD or the flash memory of the drive assist apparatus 100 by the storage medium being attached to a drive device.

The storage portion 170 may be realized by the various storage devices described above, an EEPROM (Electronically Erasable Programmable Read Only Memory), a ROM (Read Only Memory), a RAM (Random Access Memory), or the like. The storage portion 170 stores, for example, information required for performing various controls in the embodiment, a program, various other information, and the like. As the various information, for example, drive data relating to previous driving of the host vehicle may be stored in the storage portion 170.

The travelable width detection portion 110 detects a travelable width indicating a width of a road on which the host vehicle is travelable on the basis of a recognition result that is output from the object recognition device 16. The detection of the travelable width by the travelable width detection portion 110 will be described later in detail.

The avoidance target recognition portion 120 recognizes an avoidance target which is a target with which a host vehicle should avoid coming into contact when traveling on a road on the basis of a recognition result that is output from the object recognition device 16. The avoidance target includes, for example, a traffic participant such as an oncoming vehicle and a pedestrian, a static obstacle such as a power pole, a parked vehicle, and an abandoned object, a road boundary, and the like.

The distance measurement portion 130 measures the distance between the host vehicle and the avoidance target on the basis of a position of the avoidance target (the oncoming vehicle or the like) recognized by the avoidance target recognition portion 120. For example, the distance measurement portion 130 may measure the distance between the host vehicle and the avoidance target on the basis of a gravity center position of the host vehicle and a gravity center position of the avoidance target. The measurement method by the distance measurement portion 130 is not limited thereto, and the distance between an arbitrary point of the host vehicle and an arbitrary point of the avoidance target may be measured as the distance between the host vehicle and the avoidance target.

The margin detection portion 140 detects a margin indicating the distance between the host vehicle and the avoidance target at the time of mutual passing between the host vehicle and the avoidance target (the oncoming vehicle or the like). For example, the margin detection portion 140 may detect the distance between the host vehicle and the avoidance target on the basis of a detection result of the sonar 15. The detection method of the margin detection portion 140 is not limited thereto, and the margin may be detected by using another sensor. Further, the margin detection portion 140 may detect, as the margin, the shortest distance between the host vehicle and the avoidance target at the time of mutual passing.

The evaluation portion 150 evaluates driving of a driver at the time of mutual passing on the basis of the margin detected by the margin detection portion 140. For example, the evaluation portion 150 evaluates whether right and left margins of the host vehicle are sufficiently ensured at the time of mutual passing, whether the host vehicle is too close to the right side, whether the host vehicle is too close to the left side, or the like.

The output control portion 160 causes an output device such as the HMI 30 to output an advice for a driver who drives the host vehicle at a plurality of stages which include: a pre-stage before mutual passing between the host vehicle and the avoidance target; and a post-stage after mutual passing between the host vehicle and the avoidance target. For example, the output control portion 160 may cause the display portion 32 to display a message indicating the content of the advice or may cause the speaker 34 to output a voice reading the content of the advice. Hereinafter, an output process of the advice of the present embodiment at each of the pre-stage before mutual passing, a stage of mutual passing, and the post-stage after mutual passing will be described in detail.

[Pre-Stage Before Mutual Passing]

Figure 2:
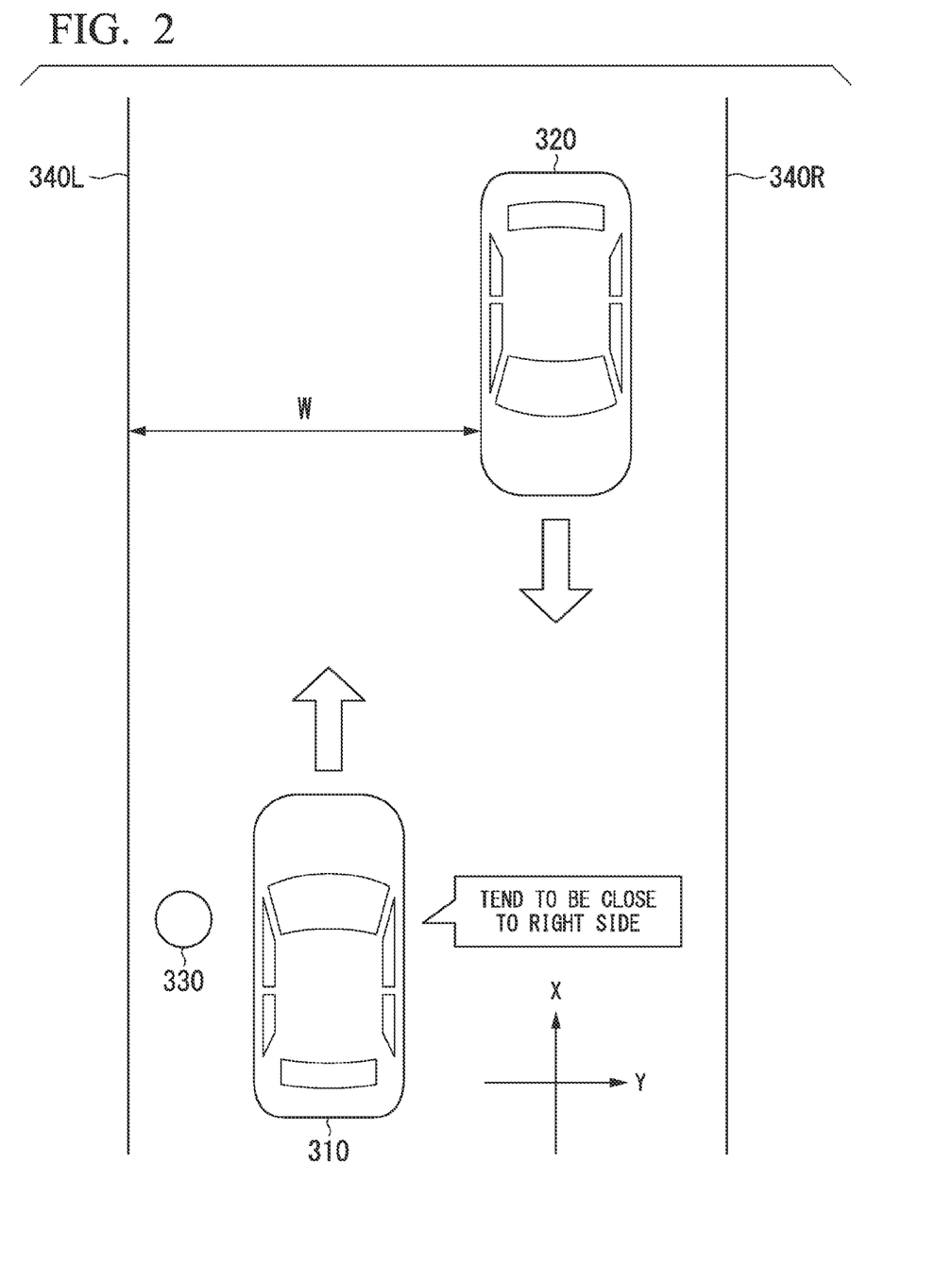
FIG. 2 is a view showing a situation of a pre-stage before mutual passing between a host vehicle and an oncoming vehicle.

FIG. 2 is a view showing a situation of a pre-stage before mutual passing between a host vehicle and an oncoming vehicle. In FIG. 2, an upward direction is an X direction, and a rightward direction is a Y direction. A host vehicle 310 is traveling in a +X direction, and an oncoming vehicle 320 is traveling in a −X direction.

In FIG. 2, the oncoming vehicle 320, a power pole 330, and road boundaries 340L, 340R are shown as an example of a target (avoidance target) with which the host vehicle 310 should avoid coming into contact when traveling on the road.

The road boundaries 340L, 340R are, for example, a white line, a guardrail, a wall, a step, or the like.

When the driver of the host vehicle 310 is not familiar with driving, there is a possibility that the host vehicle 310 does not travel in the middle of a lane but travels near the right side or the left side of the lane. When the host vehicle travels near the right side or the left side of the lane, there is a possibility that the host vehicle 310 comes too close to the avoidance target (the oncoming vehicle 320 or the like), or the host vehicle comes into contact with the avoidance target.

Therefore, the output control portion 160 causes the HMI 30 to output an advice for the driver who drives the host vehicle 310. Specifically, the output control portion 160 causes the HMI 30 to output an advice corresponding to a driving tendency of the driver at the pre-stage before mutual passing on the basis of the margin detected by the margin detection portion 140 at a previous time of mutual passing. For example, the output control portion 160 may acquire the margin detected by the margin detection portion 140 at the previous time of mutual passing from the previous driving data stored in the storage portion 170.

The content of the advice at the pre-stage before mutual passing is, for example, "tend to be close to the right side" or "tend to be close to the left side". The content of the advice is not limited thereto as long as the advice is an advice with respect to the driving of the driver.

For example, when the driver tends to drive such that the host vehicle 310 is close to the right side at the time of mutual passing between the host vehicle 310 and the avoidance target, the output control portion 160 causes the HMI 30 to output an advice "tend to be close to the right side" as shown in FIG. 2. In this case, the output control portion 160 may cause the display portion 32 to display the advice "tend to be close to the right side" or may cause the speaker 34 to output a voice reading the content of the advice. Thereby, the driver of the host vehicle 310 can perceive the advice corresponding to the driving tendency of the driver at the pre-stage before mutual passing.

However, when a possibility that the host vehicle 310 comes too close to the avoidance target, or the host vehicle 310 comes into contact with the avoidance target is low, the output control portion 160 may not cause the HMI 30 to output the advice for the driver. For example, when a travelable width W indicating a width of the road where the host vehicle 310 is travelable is larger than a predetermined width, the output control portion 160 may not cause the HMI 30 to output the advice for the driver. This point is described below.

At the pre-stage before mutual passing between the host vehicle 310 and the oncoming vehicle 320, the travelable width detection portion 110 detects a travelable width W indicating the width of the road in the Y direction where the host vehicle 310 is travelable. In the example shown in FIG. 2, the travelable width W is a distance between the oncoming vehicle 320 and the road boundary 340L. For example, the travelable width detection portion 110 may detect the travelable width W on the basis of a detection result of the LIDAR 14. The detection method of the travelable width detection portion 110 is not limited thereto, and the travelable width W may be detected by using another sensor.

Next, the output control portion 160 determines whether or not the travelable width W detected by the travelable width detection portion 110 is larger than a predetermined width W1. The predetermined width W1 is a preset value and is, for example, a value of about 275 cm.

When the travelable width W detected by the travelable width detection portion 110 is larger than the predetermined width, a possibility that the host vehicle 310 comes too close to the avoidance target (the oncoming vehicle 320, the power pole 330, a wall, a guardrail, or the like), or the host vehicle comes into contact with the avoidance target is low.

Therefore, when the travelable width W detected by the travelable width detection portion 110 is larger than the predetermined width W1, the output control portion 160 does not cause the HMI 30 to output the advice for the driver. Thereby, it is possible to reduce a process load of the drive assist apparatus 100.

[Stage of Mutual Passing]

Figure 3:
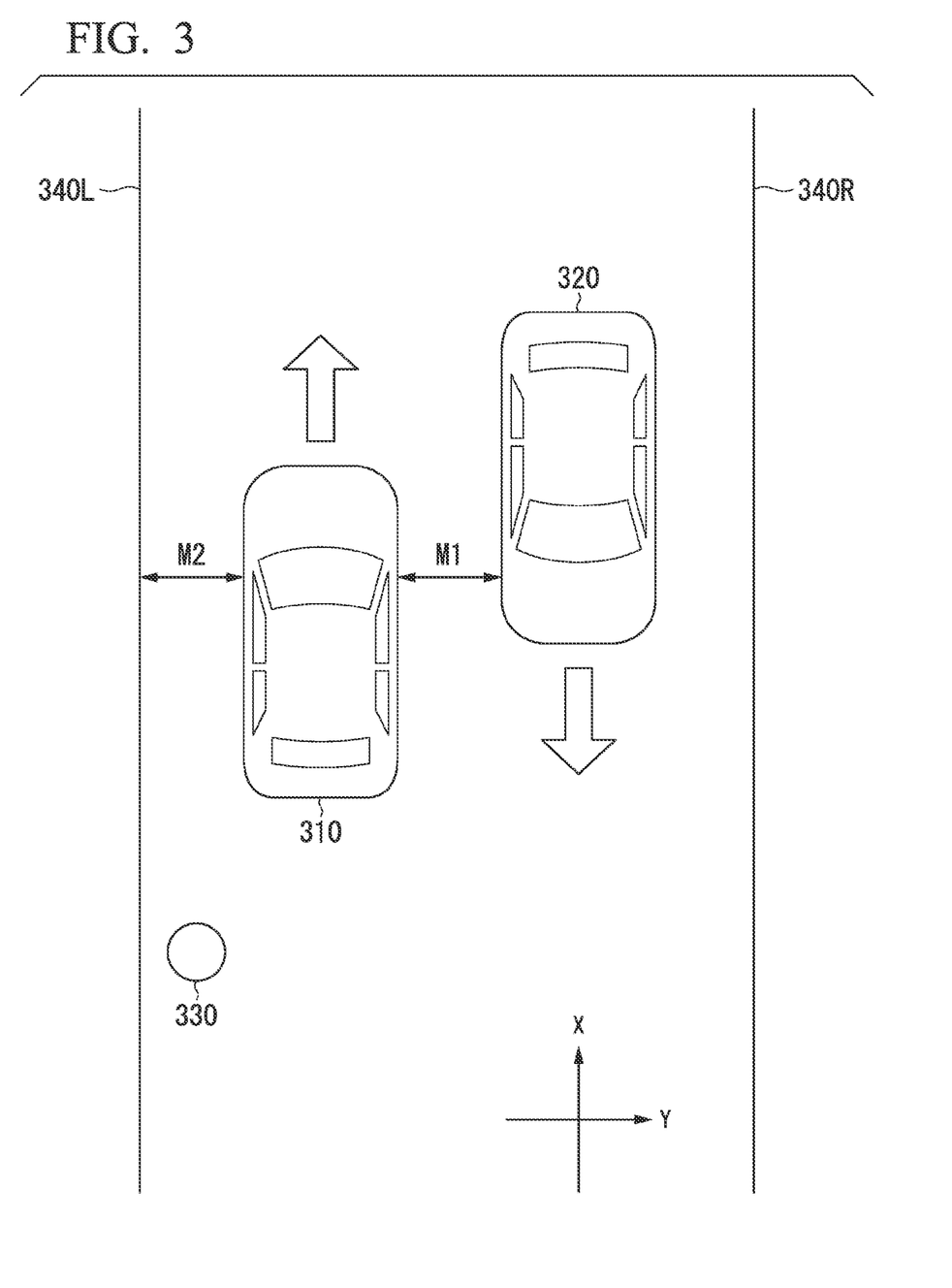
FIG. 3 is a view showing a situation of mutual passing between the host vehicle and the oncoming vehicle.

FIG. 3 is a view showing a situation of mutual passing between the host vehicle and the oncoming vehicle. As shown in FIG. 3, when the host vehicle 310 and the oncoming vehicle 320 mutually pass, the margin detection portion 140 detects right and left margins of the host vehicle 310. The margin is a value indicating the distance between the host vehicle 310 and the avoidance target at the time of mutual passing between the host vehicle 310 and the avoidance target (the oncoming vehicle 320 or the like).

A margin M1 is a right margin of the host vehicle 310. In the example of FIG. 3, the margin M1 indicates a distance in the Y direction between the host vehicle 310 and the oncoming vehicle 320 at the time of mutual passing between the host vehicle 310 and the oncoming vehicle 320. A margin M2 is a left margin of the host vehicle 310. In the example of FIG. 3, the margin M2 indicates a distance in the Y direction between the host vehicle 310 and the road boundary 340L. When the host vehicle 310 passes the power pole 330, the margin M2 indicates a distance between the host vehicle 310 and the power pole 330. The margins M1, M2 may be detected, for example, on the basis of a detection result of the sonar 15.

The margin detection portion 140 may detect, as the margin, the shortest distance between the host vehicle 310 and the avoidance target (the oncoming vehicle 320 or the like) at the time of mutual passing. The margin detection portion 140 stores the detected margins M1, M2 in the storage portion 170.

As shown in FIG. 3, at a stage where the mutual passing between the host vehicle 310 and the oncoming vehicle 320 is being performed, the output control portion 160 does not cause the HMI 30 to output the advice for the driver. Thereby, it is possible for the driver to concentrate on the driving of the host vehicle 310 at the time of mutual passing between the host vehicle 310 and the oncoming vehicle 320.

Further, at a stage where the mutual passing between the host vehicle 310 and the oncoming vehicle 320 is being performed, the output control portion 160 may cause the display portion 32 to display the message indicating the content of the advice while causing the speaker 34 not to output the voice reading the content of the advice. In this way, it is also possible for the driver to concentrate on the driving of the host vehicle 310 at the time of mutual passing between the host vehicle 310 and the oncoming vehicle 320.

[Post-Stage After Mutual Passing]

Figure 4:
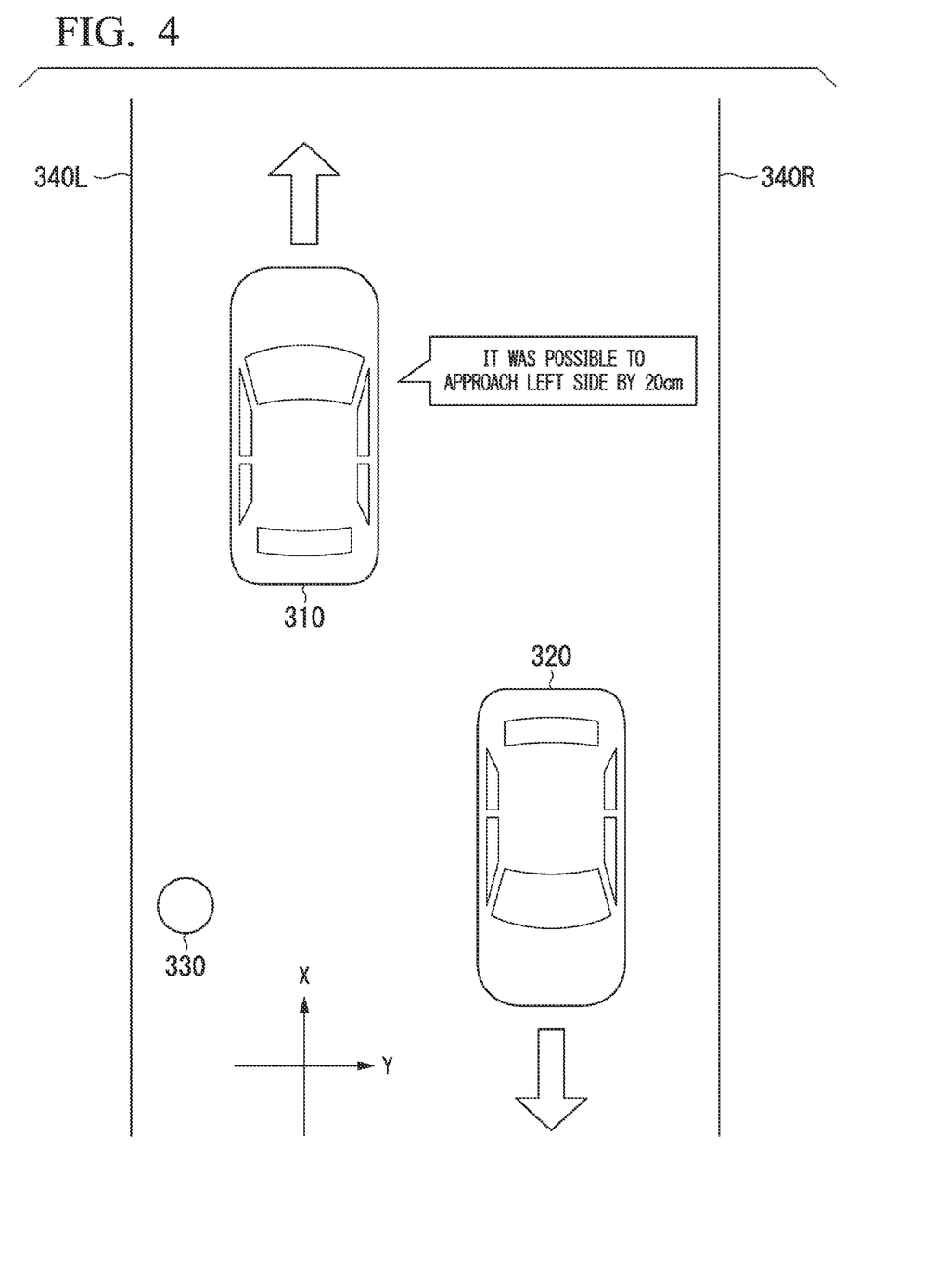
FIG. 4 is a view showing a situation of a post-stage after mutual passing between the host vehicle and the oncoming vehicle.

FIG. 4 is a view showing a situation of a post-stage after mutual passing between the host vehicle and the oncoming vehicle. At the post-stage after mutual passing, the evaluation portion 150 evaluates the driving of the driver at the time of mutual passing on the basis of the margins M1, M2 detected by the margin detection portion 140. At the post-stage after mutual passing, the output control portion 160 causes the HMI 30 to output an advice based on an evaluation result of the evaluation portion 150.

The content of the advice at the post-stage after mutual passing is, for example, "the driving was good", "it was possible to approach the left side by X cm", "it was possible to approach the right side by X cm", or "the driving was a dangerous driving". The content of the advice is not limited thereto as long as the advice is an advice with respect to the driving of the driver.

For example, the evaluation portion 150 calculates a difference (M1−M2) obtained by subtracting the margin M2 from the margin M1. The evaluation portion 150 generates an evaluation result that it was a good driving when the absolute value of the calculated difference is less than a predetermined value. In this case, the output control portion 160 causes the HMI 30 to output an advice that "the driving was good" on the basis of the evaluation result of the evaluation portion 150.

On the other hand, when the absolute value of the calculated difference is equal to or more than the predetermined value, and a relationship M1<M2 is satisfied, the evaluation portion 150 generates an evaluation result that the host vehicle was too close to the right side. In this case, the output control portion 160 causes the HMI 30 to output an advice that "it was possible to approach the left side by X cm" on the basis of the evaluation result of the evaluation portion 150. The evaluation portion 150 may calculate a value of "X cm" by dividing the absolute value of the calculated difference by 2.

When the absolute value of the calculated difference is equal to or more than the predetermined value, and a relationship M1>M2 is satisfied, the evaluation portion 150 generates an evaluation result that the host vehicle was too close to the left side. In this case, the output control portion 160 causes the HMI 30 to output an advice that "it was possible to approach the right side by X cm" on the basis of the evaluation result of the evaluation portion 150. Also in this case, the evaluation portion 150 may calculate a value of "X cm" by dividing the absolute value of the calculated difference by 2.

When the margin M1 or M2 is equal to or less than a predetermined value, the evaluation portion 150 generates an evaluation result that the driving was a dangerous driving. In this case, the output control portion 160 causes the HMI 30 to output an advice that "the driving was a dangerous driving" on the basis of the evaluation result of the evaluation portion 150. The predetermined value used to determine the dangerous driving is a preset value and is, for example, a value of about 10 cm.

As described above, the distance measurement portion 130 measures a distance between the host vehicle 310 and the avoidance target in a travel direction of the host vehicle 310. The output control portion 160 determines whether or not the host vehicle 310 reaches the pre-stage before mutual passing or the post-stage after mutual passing on the basis of the distance measured by the distance measurement portion 130. For example, when the distance between the host vehicle 310 and the avoidance target measured by the distance measurement portion 130 is equal to or less than a first threshold value TH1, the output control portion 160 may determine that the host vehicle 310 is at the pre-stage before mutual passing. The first threshold value TH1 is a preset value and is, for example, a value of about 200 cm. After the mutual passing is completed, when the distance between the host vehicle 310 and the avoidance target measured by the distance measurement portion 130 is equal to or more than a second threshold value TH2, the output control portion 160 may determine that the host vehicle 310 is at the post-stage after mutual passing. The second threshold value TH2 is a preset value and is, for example, a value of about 200 cm.

[Flowchart of Drive Assist Apparatus]

Figure 5:
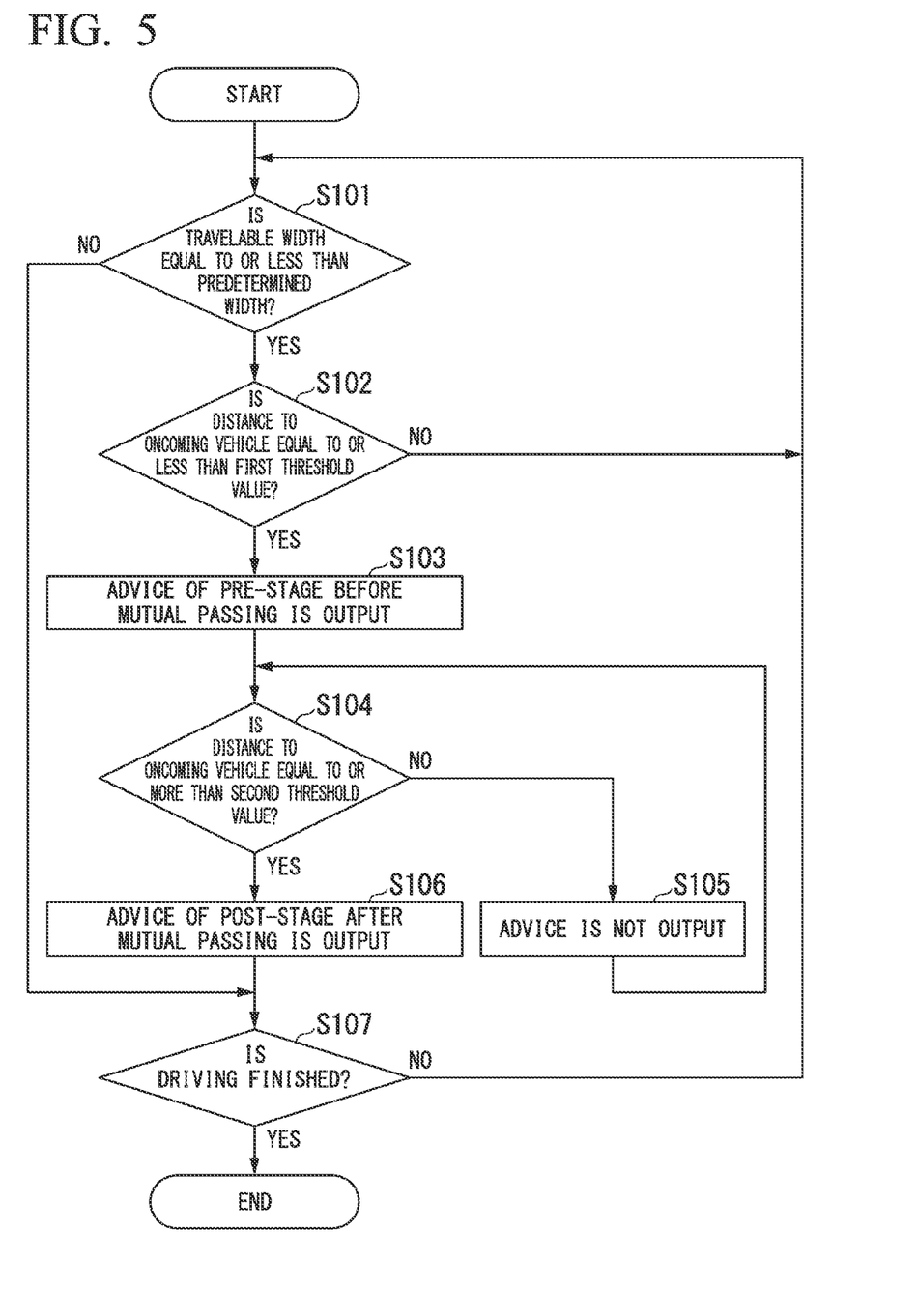
FIG. 5 is a flowchart showing an example of a process flow performed by a drive assist apparatus according to the first embodiment.

FIG. 5 is a flowchart showing an example of a process flow performed by the drive assist apparatus 100 according to the first embodiment. The present flowchart is performed in response to a driver starting driving the host vehicle 310. In the present flowchart, an example in which the avoidance target is the oncoming vehicle 320 is described.

First, the travelable width detection portion 110 detects a travelable width W indicating the width of the road on which the host vehicle 310 is travelable. The output control portion 160 determines whether or not the travelable width W detected by the travelable width detection portion 110 is equal to or less than the predetermined width W1 (Step S101). As described above, the predetermined width W1 is a preset value and is, for example, a value of about 275 cm.

When the travelable width W detected by the travelable width detection portion 110 is equal to or less than the predetermined width W1, the output control portion 160 determines whether or not the distance from the host vehicle 310 to the oncoming vehicle 320 is equal to or less than the first threshold value TH1 on the basis of a measurement result of the distance measurement portion 130 (Step S102). When the distance from the host vehicle 310 to the oncoming vehicle 320 is not equal to or less than the first threshold value TH1, the routine returns to the process of Step S101 described above.

On the other hand, when the distance from the host vehicle 310 to the oncoming vehicle 320 is equal to or less than the first threshold value TH1, the output control portion 160 causes the HMI 30 to output the advice of the pre-stage before mutual passing (Step S103). Specifically, the output control portion 160 causes the HMI 30 to output an advice corresponding to a driving tendency of the driver on the basis of the margin detected by the margin detection portion 140 at a previous time of mutual passing. For example, the output control portion 160 causes the HMI 30 to output an advice of a content "tend to be close to the right side" or "tend to be close to the left side".

Next, the output control portion 160 determines whether or not the distance from the host vehicle 310 to the oncoming vehicle 320 is equal to or more than the second threshold value TH2 on the basis of the measurement result of the distance measurement portion 130 (Step S104). When the distance from the host vehicle 310 to the oncoming vehicle 320 is not equal to or more than the second threshold value TH2, the output control portion 160 does not cause the HMI 30 to output the advice for the driver (Step S105) and returns to the process of Step S104. Thereby, it is possible for the driver to concentrate on the driving of the host vehicle 310 at the time of mutual passing between the host vehicle 310 and the oncoming vehicle 320.

On the other hand, when the distance from the host vehicle 310 to the oncoming vehicle 320 is equal to more than the second threshold value TH2, the output control portion 160 causes the HMI 30 to output an advice of the post-stage after mutual passing (Step S106). Specifically, the evaluation portion 150 evaluates the driving of the driver at the time of mutual passing on the basis of the margins M1, M2 detected by the margin detection portion 140, and the output control portion 160 causes the HMI 30 to output an advice based on the evaluation result of the evaluation portion 150 at the post-stage after mutual passing. For example, the output control portion 160 causes the HMI 30 to output an advice of a content "the driving was good", "it was possible to approach the left side by X cm", "it was possible to approach the right side by X cm", or "the driving was a dangerous driving".

Next, the output control portion 160 determines whether or not the driving is finished (Step S107).

For example, the output control portion 160 determines that the driving is finished when the driver stops the engine of the host vehicle 310. When it is determined that the driving is finished, the process by the present flowchart is finished. On the other hand, when it is not determined that the driving is finished, the routine returns to the process of Step S101 described above.

When it is determined in Step S101 described above that the travelable width W detected by the travelable width detection portion 110 is not equal to or less than the predetermined width W1, the output control portion 160 proceeds to the process of Step S107 without performing the processes of Steps S102 to S106. Thereby, it is possible to reduce a process load of the drive assist apparatus 100.

According to the first embodiment described above, the output control portion 160 causes the HMI 30 to output an advice for a driver who drives the host vehicle 310 at a plurality of stages which include: the pre-stage before mutual passing between the host vehicle 310 and the avoidance target (the oncoming vehicle 320 or the like); and the post-stage after mutual passing, wherein the advice is different for each of the plurality of stages. Thereby, it is possible to perform an appropriate drive assist notification at a plurality of stages that include the stage before mutual passing and the stage after mutual passing.

Second Embodiment

Next, a second embodiment is described. In the first embodiment, the output control portion 160 determines whether or not the host vehicle 310 reaches the pre-stage before mutual passing or the post-stage after mutual passing on the basis of the distance between a position (for example, a gravity center position) of the host vehicle 310 and a position (for example, a gravity center position) of the avoidance target. On the other hand, in the second embodiment, whether or not the host vehicle 310 reaches the pre-stage before mutual passing or the post-stage after mutual passing is determined on the basis of the distance between the position of the host vehicle 310 and a position where the travelable width W becomes equal to or less than the predetermined width W1. Thereby, even when it is difficult to accurately know the position of the avoidance target, it is possible to accurately determine the pre-stage before mutual passing or the post-stage after mutual passing. Hereinafter, the detail of the second embodiment is described.

[Pre-Stage of Mutual Passing]

Figure 6:
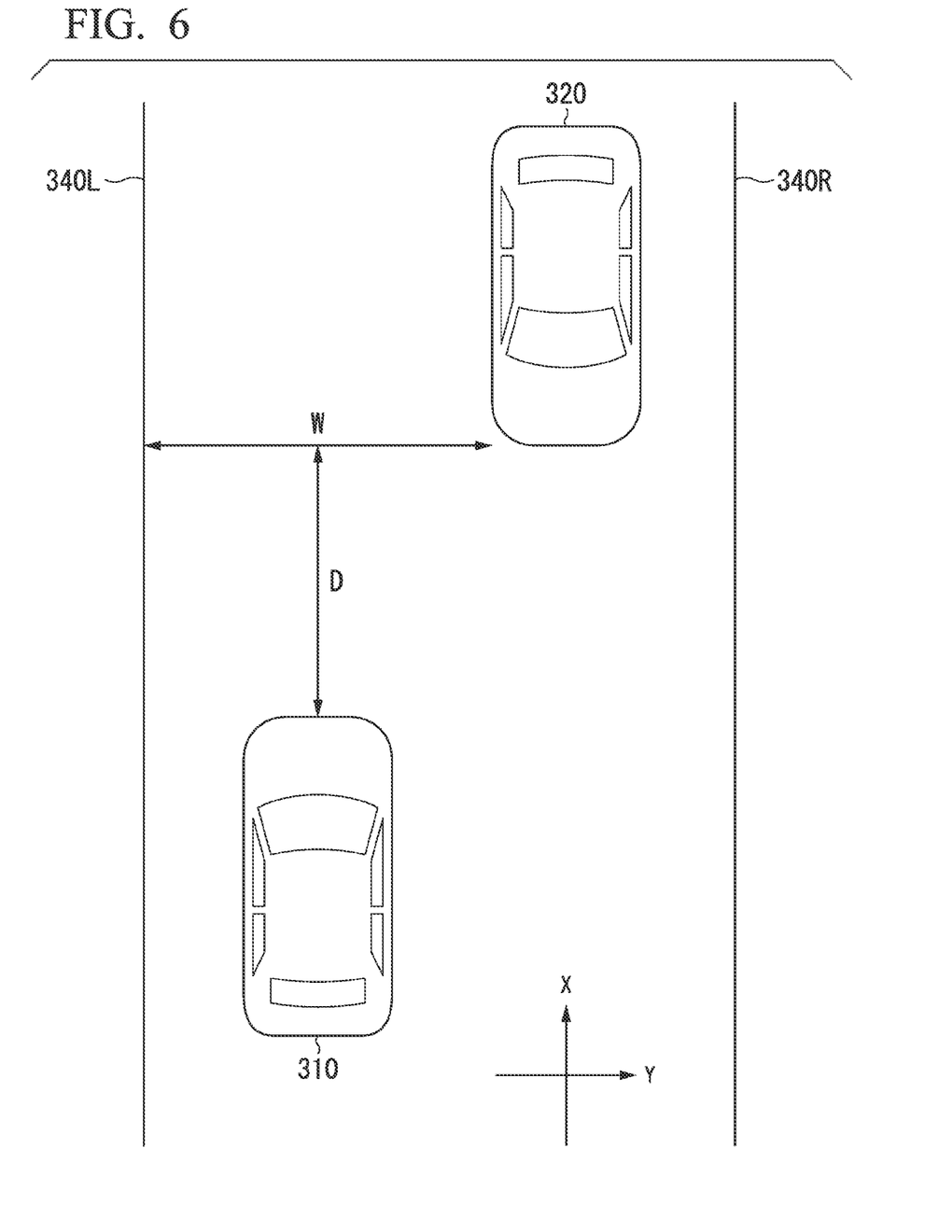
FIG. 6 is a view showing a situation of a pre-stage before mutual passing between a host vehicle and an oncoming vehicle according to a second embodiment.

FIG. 6 is a view showing a situation of a pre-stage before mutual passing between a host vehicle and an oncoming vehicle according to the second embodiment. In FIG. 6, an upward direction is a X direction, and a rightward direction is a Y direction. The host vehicle 310 travels in a +X direction, and the oncoming vehicle 320 travels in a −X direction.

At the pre-stage before mutual passing between the host vehicle 310 and the oncoming vehicle 320, the travelable width detection portion 110 detects a travelable width W indicating the width of the road in the Y direction where the host vehicle 310 is travelable. In the example shown in FIG. 6, the travelable width W is a distance between the oncoming vehicle 320 and the road boundary 340L. For example, the travelable width detection portion 110 may detect the travelable width W on the basis of a detection result of the LIDAR 14. The detection method of the travelable width detection portion 110 is not limited thereto, and the travelable width W may be detected by using another sensor.

Next, the distance measurement portion 130 measures a distance D in a travel direction of the host vehicle 310 between the host vehicle 310 and the position where the travelable width W detected by the travelable width detection portion 110 is equal to or less than the predetermined width W1. For example, the distance measurement portion 130 measures the distance D from a middle of a front end of the host vehicle 310 to the position where the travelable width W is equal to or less than the predetermined width W1. The measurement method of the distance D by the distance measurement portion 130 is not limited thereto. For example, the distance between an arbitrary point of the host vehicle 310 and an arbitrary point of the position where the travelable width W is equal to or less than the predetermined width W1 may be measured as the distance D.

The output control portion 160 determines whether or not the host vehicle 310 reaches the pre-stage before mutual passing on the basis of the distance D measured by the distance measurement portion 130. For example, when the distance D measured by the distance measurement portion 130 is equal to or less than the first threshold value TH1, the output control portion 160 may determine that the host vehicle 310 is at the pre-stage before mutual passing.

[Post-Stage of Mutual Passing]

Figure 7:
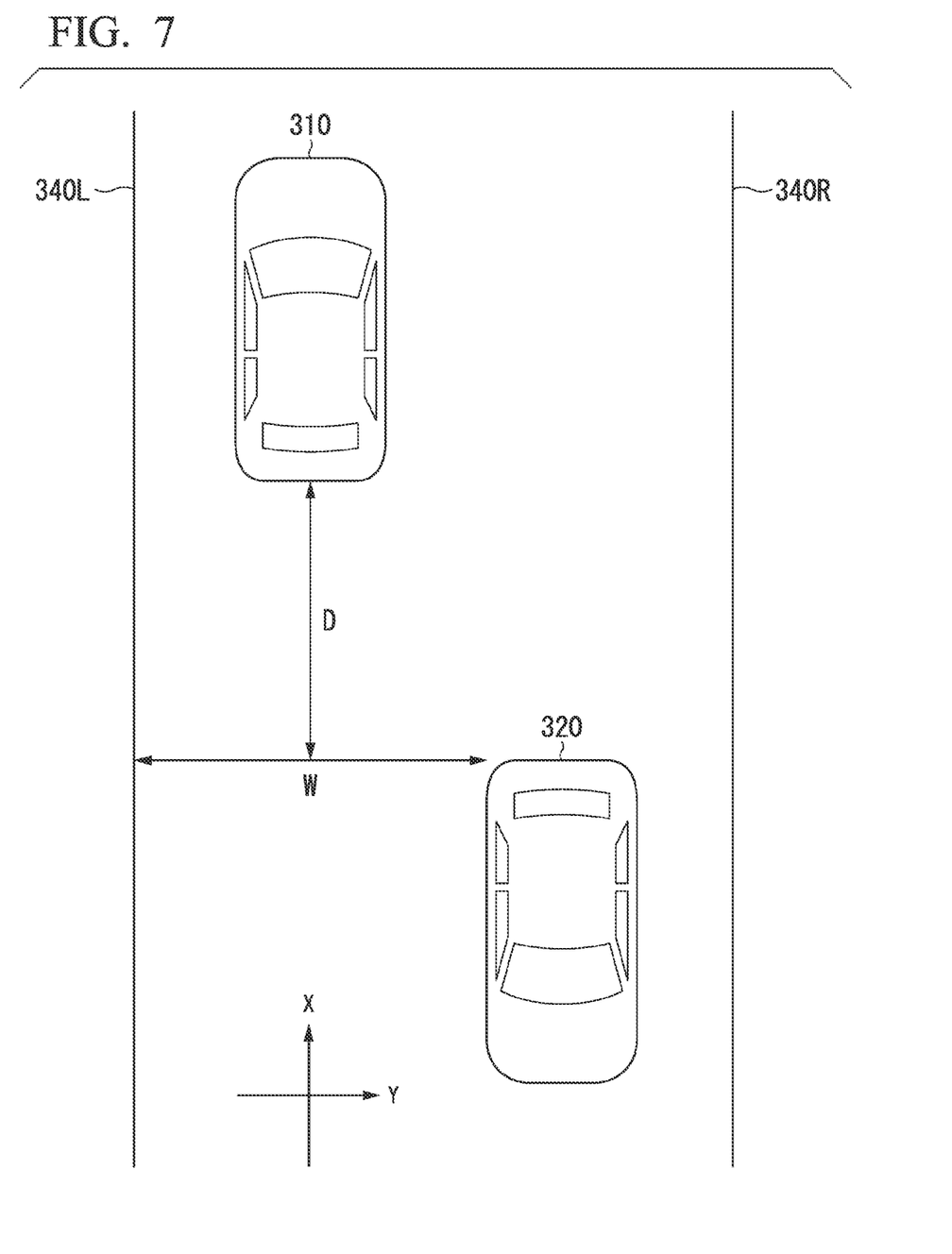
FIG. 7 is a view showing a situation of a post-stage after mutual passing between the host vehicle and the oncoming vehicle according to the second embodiment.

FIG. 7 is a view showing a situation of a post-stage after mutual passing between a host vehicle and an oncoming vehicle according to the second embodiment. In FIG. 7, an upward direction is a X direction, and a rightward direction is a Y direction. The host vehicle 310 travels in a +X direction, and the oncoming vehicle 320 travels in a −X direction.

At the post-stage after mutual passing between the host vehicle 310 and the oncoming vehicle 320, the travelable width detection portion 110 detects a travelable width W behind the host vehicle 310. In the example shown in FIG. 7, the travelable width W is a distance between the oncoming vehicle 320 and the road boundary 340L. For example, the travelable width detection portion 110 may detect the travelable width W on the basis of a detection result of the LIDAR 14 that is provided on a rear portion of the host vehicle 310. The detection method of the travelable width detection portion 110 is not limited thereto, and the travelable width W may be detected by using another sensor.

Next, the distance measurement portion 130 measures a distance D between the host vehicle 310 and the position where the travelable width W detected by the travelable width detection portion 110 is equal to or less than the predetermined width W1 after the host vehicle 310 passes the oncoming vehicle 320. For example, the distance measurement portion 130 measures the distance D from a middle of a rear end of the host vehicle 310 to the position where the travelable width W is equal to or less than the predetermined width W1. The measurement method of the distance D by the distance measurement portion 130 is not limited thereto. For example, the distance between an arbitrary point of the host vehicle 310 and an arbitrary point of the position where the travelable width W is equal to or less than the predetermined width W1 may be measured as the distance D.

The output control portion 160 determines whether or not the host vehicle 310 reaches the post-stage after mutual passing on the basis of the distance D measured by the distance measurement portion 130. For example, when the distance D measured by the distance measurement portion 130 is equal to or less than the second threshold value TH2, the output control portion 160 may determine that the host vehicle 310 is at the post-stage after mutual passing.

For example, in a case where the oncoming vehicle 320 is a large truck, since the vehicle body is long in the X direction, it is difficult to accurately know a position (for example, a gravity center position) of the vehicle body. In such a case, it is possible to accurately determine the pre-stage before mutual passing or the post-stage after mutual passing by using the distance measurement method of the second embodiment rather than the distance measurement method of the first embodiment.

[Flowchart of Drive Assist Apparatus]

Figure 8:
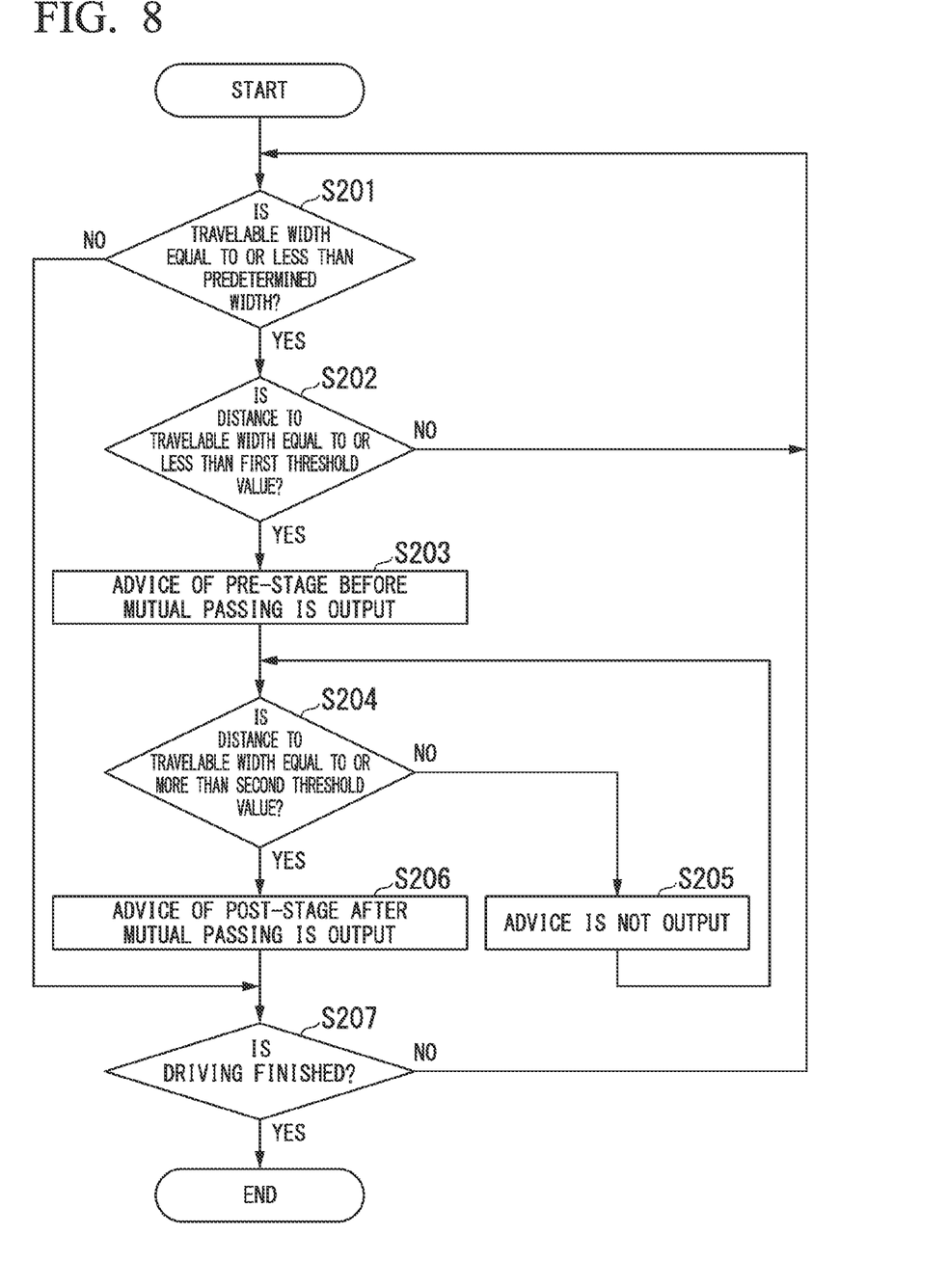
FIG. 8 is a flowchart showing an example of a process flow performed by a drive assist apparatus according to the second embodiment.

FIG. 8 is a flowchart showing an example of a process flow performed by the drive assist apparatus 100 according to the second embodiment. The present flowchart is performed in response to a driver starting driving the host vehicle 310. In the present flowchart, an example in which the avoidance target is the oncoming vehicle 320 is described.

First, the travelable width detection portion 110 detects a travelable width W indicating the width of the road on which the host vehicle 310 is travelable. The output control portion 160 determines whether or not the travelable width W detected by the travelable width detection portion 110 is equal to or less than the predetermined width W1 (Step S201). As described above, the predetermined width W1 is a preset value and is, for example, a value of about 275 cm.

When the travelable width W detected by the travelable width detection portion 110 is equal to or less than the predetermined width W1, the output control portion 160 determines whether or not the distance D from the host vehicle 310 to the position where the travelable width W is equal to or less than the predetermined width W1 is equal to or less than the first threshold value TH1 on the basis of the measurement result of the distance measurement portion 130 (Step S202). When the distance from the host vehicle 310 to the position where the travelable width W is equal to or less than the predetermined width W1 is not equal to or less than the first threshold value TH1, the routine returns to the process of Step S201 described above.

On the other hand, when the distance from the host vehicle 310 to the position where the travelable width W is equal to or less than the predetermined width W1 is equal to or less than the first threshold value TH1, the output control portion 160 causes the HMI 30 to output the advice of the pre-stage before mutual passing (Step S203). Specifically, the output control portion 160 causes the HMI 30 to output an advice corresponding to a driving tendency of the driver on the basis of the margin detected by the margin detection portion 140 at a previous time of mutual passing. For example, the output control portion 160 causes the HMI 30 to output an advice of a content "tend to be close to the right side" or "tend to be close to the left side".

Next, the output control portion 160 determines whether or not the distance D from the host vehicle 310 to the position where the travelable width W is equal to or less than the predetermined width W1 is equal to or more than the second threshold value TH2 on the basis of the measurement result of the distance measurement portion 130 (Step S204). When the distance D from the host vehicle 310 to the position where the travelable width W is equal to or less than the predetermined width W1 is not equal to or more than the second threshold value TH2, the output control portion 160 does not cause the HMI 30 to output the advice for the driver (Step S205) and returns to the process of Step S204. Thereby, it is possible for the driver to concentrate on the driving of the host vehicle 310 at the time of mutual passing between the host vehicle 310 and the oncoming vehicle 320.

On the other hand, when the distance from the host vehicle 310 to the position where the travelable width W is equal to or less than the predetermined width W1 is equal to or more than the second threshold value TH2, the output control portion 160 causes the HMI 30 to output the advice of the post-stage after mutual passing (Step S206). Specifically, the evaluation portion 150 evaluates the driving of the driver at the time of mutual passing on the basis of the margins M1, M2 detected by the margin detection portion 140, and the output control portion 160 causes the HMI 30 to output an advice based on the evaluation result of the evaluation portion 150 at the post-stage after mutual passing. For example, the output control portion 160 causes the HMI 30 to output an advice of a content "the driving was good", "it was possible to approach the left side by X cm", "it was possible to approach the right side by X cm", or "the driving was a dangerous driving".

Next, the output control portion 160 determines whether or not the driving is finished (Step S207).

For example, the output control portion 160 determines that the driving is finished when the driver stops the engine of the host vehicle 310. When it is determined that the driving is finished, the process by the present flowchart is finished. On the other hand, when it is not determined that the driving is finished, the routine returns to the process of Step S201 described above.

When it is determined in Step S201 described above that the travelable width W detected by the travelable width detection portion 110 is not equal to or less than the predetermined width W1, the output control portion 160 proceeds to the process of Step S207 without performing the processes of Steps S202 to S206. Thereby, it is possible to reduce a process load of the drive assist apparatus 100.

According to the second embodiment described above, the distance measurement portion 130 measures the distance D in the travel direction of the host vehicle 310 between the host vehicle 310 and a position where the travelable width W detected by the travelable width detection portion 110 is equal to or less than the predetermined width W1, and the output control portion 160 determines whether or not the host vehicle 310 reaches the pre-stage before mutual passing or the post-stage after mutual passing on the basis of the distance D measured by the distance measurement portion 130. Thereby, even when it is difficult to know the position of the avoidance target, it is possible to accurately determine the pre-stage before mutual passing or the post-stage after mutual passing.

The embodiments described above can be represented as follows.

A drive assist apparatus includes: a storage device that stores a program; and a hardware processor, wherein the hardware processor executes the program stored in the storage device and thereby performs: recognizing an avoidance target which is a target with which a host vehicle should avoid coming into contact when traveling on a road; and causing an output device to output an advice for a driver who drives the host vehicle at a plurality of stages which include: a pre-stage before mutual passing between the host vehicle and the avoidance target; and a post-stage after the mutual passing.

Although a mode for implementing the present invention has been described using the embodiments, the present invention is not limited to such embodiments, and various modifications and substitutions can be made without departing from the scope of the present invention.

What is claimed is:

1. A drive assist apparatus comprising:
   at least one memory configured to store instructions; and
   at least one processor configured to execute the instructions to:
   recognize an oncoming target with which a host vehicle should avoid coming into contact, the recognition performed based on data obtained during previous driving of the host vehicle before mutual passing between the host vehicle and the oncoming target;
   output a first advice for a driver of the host vehicle before the mutual passing between the host vehicle and the oncoming target, the first advice corresponding to the previous driving of the host vehicle; and
   output a second advice for the driver of the host vehicle after the mutual passing, the second advice corresponding to current driving of the host vehicle.

2. The drive assist apparatus according to claim 1, wherein the at least one processor is configured to execute the instructions to:
   detect a margin indicating a distance between the host vehicle and the oncoming target at a time of the mutual passing, wherein the output of the first advice comprises output the first advice corresponding to a driving tendency of the driver before the mutual passing based on the detected margin at a previous time of the mutual passing.

3. The drive assist apparatus according to claim 2, wherein the at least one processor is configured to execute the instructions to:
evaluate a driving of the driver at the time of the mutual passing based on the detected margin,
wherein the output of the second advice comprises output the second advice, based on an evaluation result of the evaluation, after the mutual passing.

4. The drive assist apparatus according to claim 2, wherein the detect comprises detect, as the margin, a shortest distance between the host vehicle and the oncoming target at the time of the mutual passing.

5. The drive assist apparatus according to claim 1, wherein the at least one processor is configured to execute the instructions to:
not output the first advice, in a case where the mutual passing is being performed.

6. The drive assist apparatus according to claim 1, wherein the at least one processor is configured to execute the instructions to:
detect a travelable width indicating a width of the road where the host vehicle is travelable; and
not output the second advice in a case where the travelable width is larger than a predetermined width.

7. The drive assist apparatus according to claim 1, wherein the at least one processor is configured to execute the instructions to:
measure a distance between the host vehicle and the oncoming target in a travel direction of the host vehicle; and
determine whether or not the host vehicle is before the mutual passing or after the mutual passing based on the measured distance.

8. The drive assist apparatus according to claim 6, wherein the at least one processor is configured to execute the instructions to:
measure a distance, in a travel direction of the host vehicle, between the host vehicle and a position where the detected travelable width is equal to or less than the predetermined width; and
determine whether or not the host vehicle is before the mutual passing or after the mutual passing based on the measured distance.

9. A computer-readable non-transitory recording medium which includes a program causing a computer to:
recognize an oncoming target with which a host vehicle should avoid coming into contact, the recognition performed based on data obtained during previous driving of the host vehicle before mutual passing between the host vehicle and the oncoming target;
output a first advice for a driver of the host vehicle before the mutual passing between the host vehicle and the oncoming target, the first advice corresponding to the previous driving of the host vehicle; and
output a second advice for the driver of the host vehicle after the mutual passing, the second advice corresponding to current driving of the host vehicle.

10. A computer-readable non-transitory recording medium which includes a program causing a computer to:
recognize an oncoming target with which a host vehicle should avoid coming into contact, the recognition performed based on data obtained during previous driving of the host vehicle before mutual passing between the host vehicle and the oncoming target;
output a first advice for a driver of the host vehicle before the mutual passing between the host vehicle and the oncoming target, the first advice corresponding to the previous driving of the host vehicle; and
output a second advice for the driver of the host vehicle after the mutual passing, the second advice corresponding to current driving of the host vehicle.

11. The drive assist apparatus according to claim 1, wherein the at least one processor is configured to execute the instructions to:
measure a distance between the host vehicle and the oncoming target in a travel direction of the host vehicle; and
start to output the first advice in a case where the measured distance is less than a defined threshold distance.

12. The drive assist apparatus according to claim 1, wherein the at least one processor is configured to execute the instructions to:
measure a distance between the host vehicle and the oncoming target in a travel direction of the host vehicle; and
start to output the second advice in a case where the measured distance is more than a specified threshold distance.

13. The drive assist apparatus according to claim 6, wherein the at least one processor is configured to execute the instructions to:
measure a distance, in a travel direction of the host vehicle, between the host vehicle and a position where the detected travelable width is equal to or less than the predetermined width; and
start to output the first advice in a case where the measured distance is less than a defined threshold distance.

14. The drive assist apparatus according to claim 6, wherein the at least one processor is configured to execute the instructions to:
measure a distance, in a travel direction of the host vehicle, between the host vehicle and a position where the detected travelable width is equal to or less than the predetermined width; and
start to output the second advice in a case where the measured distance is more than a specified threshold distance.

* * * * *